United States Patent Office 3,373,273
Patented Mar. 12, 1968

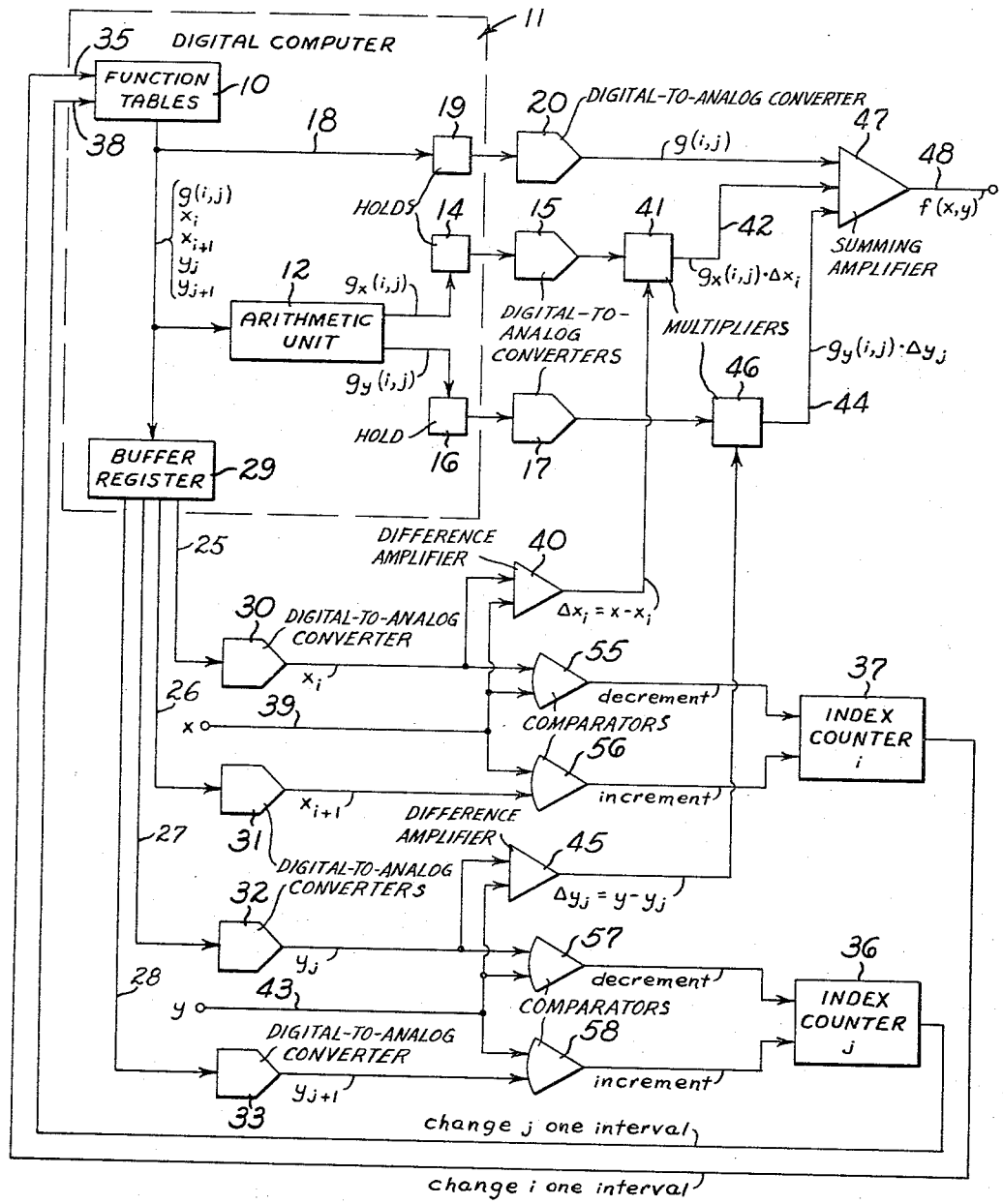

3,373,273
ANALOG FUNCTION GENERATOR INCLUDING MEANS FOR MULTIVARIABLE INTERPOLATION
Ernest J. Schubert, Hacienda Heights, Calif., assignor to Beckman Instruments, Inc., a corporation of California
Filed Apr. 17, 1964, Ser. No. 360,531
3 Claims. (Cl. 235—197)

ABSTRACT OF THE DISCLOSURE

An analog function generator employing a digital computer having a memory for storing a function table and an arithmetic unit for computing values for multivariable interpolations over a zone between a pair of limits for each independent variable function. Comparators are provided to decrement or increment index counters by generating up and down limit signals when a corresponding limit is reached, the index counters, in turn, addressing the proper section of the function tables. An index counter is provided for each independent variable.

---

This invention relates to analog function generators and, in particular, to apparatus for generating in analog form a function having a plurality of variables and a large number of break points.

Function generators are widely used in analog computers. It is customary to approximate a given function by a series of straight lines (for a single independent variable) or a series of planes (for two independent variables) joined at break points. Various electrical circuits are in use for generating the approximated function in analog form. These are typically static circuits utilizing a pair of potentiometers or other settable devices for each break point of each variable, where one potentiometer will set the value at the break point and the other will set the slope to the next break point. Circuits of this type are commonly used for functions having one or two independent variables and a small number of break points but become both economically and physically impractical as the number of variables or the number of break points increases. There are requirements today for the generation in analog form of functions having three or more independent variables and ten or more break points per variable. It is an object of the present invention to provide a new and improved analog function generator which will satisfy these requirements. It is a particular object of the invention to provide such an apparatus which can handle independent variables with any number of break points without requiring any increase in the complexity of the apparatus as the number of break points is increased.

It is an object of the invention to provide a function generator having one set of generating equipment per independent variable with each set operating within limits determined by a pair of break points of the variable. A further object is to provide such apparatus in which each set of generating equipment is changed to new operating limits when the previous limits are passed by the variable, permitting use of one set of generating equipment throughout the entire region of interest of the variable. A specific object is to provide such an apparatus wherein the limits or break points for each variable are stored in a digital computer with the operation of the digital computer integrated with the operation of the function generator.

It is an object of the invention to provide an analog function generator including means for multivariable interpolation over a zone between pairs of limits for each independent variable of the function, means for comparing an independent variable with the upper and lower limits set therefor and generating up and down limit signals when a corresponding limit is reached, and means for independently changing the pair of limits for each of the independent variables up and down to the next adjacent pair when a corresponding limit signal is generated.

It is a further object of the invention to provide such a generator including an index counter for each independent variable, with each index counter having the up and down limit signals as inputs and with the counter incrementing when the high limit signal is received and decrementing when the low limit signal is received, and with the counter change of state initiating change of the pair of limits for the corresponding independent variable.

The invention also comprises novel details of construction and novel combinations and arrangements of parts, which will more fully appear in the course of the following description. The drawing is a block diagram illustrating the interconnection of the various known components to produce the preferred embodiment of the function generator for a function having two independent variables.

Given a continuous function $f(x, y)$, where the unsubscripted variables refer to the continuous variables over the bounded region of interest, $f(x, y)$ may be approximated to any degree of accuracy by suitably choosing subregions $x_i \leq x \leq x_{i+1}$ and $y_j \leq y \leq y_{j+1}$ and representing the function in this subregion by:

$$f(x, y) = g(i, j) + g_x(i, j) \cdot \Delta x(i) + g_y(i, j) \cdot \Delta y(j) \quad (1)$$

where $$g(i, j) = f(x_i, y_j) \quad (2)$$

$$g_x(i, j) = [f(x_{i+1}, y_j) - f(x_i, y_j)]/(x_{i+1} - x_i) \quad (3)$$

$$g_y(i, j) = [f(x_i, y_{j+1}) - f(x_i, y_j)]/(y_{j+1} - y_j) \quad (4)$$

$$\Delta x(i) = x - x_i \quad (5)$$

$$\Delta y(j) = y - y_j \quad (6)$$

Thus, for a given function or set of functions all defined on the same arguments, a bound on error, and one fixed point for each function, one may determine a unique, minimal set of discrete values for the arguments for which the functions can be approximated using Equation 1.

The function values $g(i, j)$ and the discrete argument values $x_i$ and $y_j$ for $1 \leq i \leq a$, $1 \leq j \leq b$ are determined in advance for the given function and are retained in digital function tables in a digital computer memory. The intervals of the independent variables need not be uniform. The values of $g_x(i, j)$ and $g_y(i, j)$ are readily computed in the digital computer from the stored information.

The multivariable interpolation may be carried out by analog computer components as shown in the drawing.

The approximated function in digital form is stored in a memory 10 of a digital computer 11. The computer is programmed to calculate the partial difference quotients of Equations 3 and 4 as indicated by Equations 1 to 4 in an arithmetic unit 12. Inputs for the arithmetic unit are provided from the memory 10. One output from the arithmetic unit 12 is transferred to a hold register 14 and then to a digital to analog converter 15 and the other output is transferred to a hold register 16 and to a digital to analog converter 17. The value of Equation 2 is provided directly from the memory 10 via a line 18 to another hold register 19 and to a digital to analog converter 20, as well as to the arithmetic unit 12. The values of each independent variable for a particular point and for the next increment are provided sequentially from the memory 10 to the arithmetic unit and through a buffer register 29 with individual hold registers to digital to analog converters 30–33.

The values stored in the memory for the independent variable $x$ are index controlled in response to control signals on the line 35. An index counter 37 provides memory address control signals which produce outputs from the memory of the stored function values for the interpolation interval identified by $x_i$ and $x_{i+1}$. When the counter is incremented, the new address corresponds to $i+1$ and $i+2$. When the counter is decremented, the new address corresponds to $i-1$ and $i$. Similarly, the outputs for the independent variable $y$ are controlled by the index counter 36 via line 38.

The value of the independent analog variable $x$ is inserted at analog signal line 39 and is subtracted from the analog value of $x_i$ in a difference amplifier 40 to produce the difference $\Delta x_i$. The outputs from the amplifier 40 and the converter 15 are multiplied in a multiplier 41 to implement the Equation 3 via line 42. In similar fashion, the value of the independent variable $y$ is inserted on analog signal line 43 and the Equation 4 appears implemented on line 44 via a difference amplifier 45 and multiplier 46. The outputs from the converter 20 and the multipliers 41, 46 are added by means of a summing amplifier 47, whose output is the desired analog function which appears on line 48. The various units identified herein are standard computer units and will not be described in detail. The index counters are digital devices and may be incorporated in the digital computer 11.

The apparatus as described above will provide the desired analog function output by multivariable interpolation so long as the value of each of the independent variables remains between the values provided as outputs from the memory, which memory output values function as limits for the operation of the apparatus. When one of the independent variables passes one of the limits either upper or lower, the interpolation operation will no longer be within the desired accuracy as determined by the preselected increments of the independent variables during the construction of the function tables.

The apparatus of the invention includes means for automatically initiating change of the output values from the computer memory whenever a limit is passed for any of the independent variables. Each independent variable is continuously compared with both the upper and lower limit values. Whenever a limit is crossed, the corresponding counter for the particular independent variable is actuated to increment or decrement one interval, thereby changing the address in the memory and causing a new set of values to be provided on the lines 18, 25–28.

A comparator 55 has as inputs the independent variable $x$ on line 39 and the output of the converter 30 which is the lower limit. When the value of the independent variable becomes less than that of the lower limit, an output signal is generated by the comparator 55 to decrement the counter 37 one count. A similar comparator 56 has as inputs the value of the independent variable and the output of the converter 31 which is the upper limit. When the independent variable value exceeds that of the upper limit, the comparator 56 produces an output which increments the counter 37 one count. Similarly, comparators 57, 58 control the counter 36 as a function of variations of the independent variable $y$.

The apparatus of the invention is not limited to any particular number of independent variables nor to any particular number of break points in the function. The number of break poinnts for each variable is limited only by the storage capacity of the particular digital computer utilized. The particular apparatus illustrated in the drawing provides for handling of two independent variables. For each additional independent variable in the function to be generated, an additional pair of comparators, a counter, a difference amplifier, a multiplier and the associated converters and calculating section are added. The construction and operation of the apparatus for three or more independent variables is the same as that described herein for two independent variables.

In a typical application, the function generator of the invention may be used in computer simulation of an aircraft engine wherein performance curves are first determined experimentally. Independent variables may be altitude, inlet temperature and engine rating (normal or emergency). Dependent variables, each of which is a function of the independent variables, may include gross main thrust, fuel flow, momentum drag and maximum r.p.m.

Although an exemplary embodiment of the invention has been disclosed and discussed, it will be understood that other applications of the invention are possible and that the embodiment disclosed may be subjected to various changes, modifications and substitutions without necessarily departing from the spirit of the invention.

I claim as my invention:

1. In an apparatus for generating in analog form a given function having a plurality of independent variables with the given function stored in digital function tables in a digital computer memory and with the computer providing as outputs in digital form (a) the value of each independent variable at predetermined discrete intervals, (b) the value of the function at the discrete values of each independent variable, and (c) for each independent variable the value of the partial difference quotient at the discrete values of the independent variables, and with the computer including means for selecting any of the discrete intervals for outputting values in response to input signals, the apparatus including in combination:

a summing amplifier having as its output the desired analog function;

a first digital to analog converter having as the input the value (b) and having the output connected as an input to said summing amplifier;

a multiplier for each of the independent variables, with each multiplier having its output connected as an input to said summing amplifier;

a second digital to analog converter for each of the independent variables, with each converter having as the input the value (c) for the corresponding independent variable and having the output connected as an input to the corresponding one of said multipliers;

a bidirectional counter for each of the independent variables, each of the counters having a pair of inputs with a signal on one input incrementing the counter one count and with a signal on the other input decrementing the counter one count and having the output connected to the computer providing an inuput signal for incrementing and decrementing the selected discrete interval of the one variable by one interval;

a pair of comparators for each of said counters, each of the comparators having the corresponding independent variable and a reference value as inputs and having the output connected as an input to the corresponding one of said counters, with one comparator of the pair generating an output signal when the variable input exceeds the reference input thereof and with the other comparator generating an output signal when the variable input becomes less than the reference input thereof;

a pair of digital to analog converters for each pair of comparators, with one converter of a pair having as the input the value (a) for the corresponding independent variable for a given interval and with the other converter having as the input the value (a) for such independent variable for the next interval and with each converter having the output connected as the reference input to the respective comparator; and a difference amplifier for each of the independent variables, with each difference amplifier having the output connected as the other input to the corresponding multiplier and having the corresponding independent variable and the lower reference value as inputs.

2. In an analog function generator, the combination of:

means for multivariable interpolation over a zone between pairs of limits for each independent variable of the function;

means for comparing an independent variable with the upper and lower limits set therefor and generating up and down limit signals when a corresponding limit is passed; and means for independently changing the pair of limits for each of the independent variables up and down to the next adjacent pair when a corresponding limit signal is generated.

3. In an analog function generator, the combination of:

means for multivariable interpolation over a zone between pairs of limits for each independent variable of the function with each pair of limits having an identifying counter state;

means for comparing an independent variable with the upper and lower limits set therefor and generating up and down limit signals when a corresponding limit is passed;

a counter for each independent variable, each counter having the up and down limit signals for the corresponding independent variable as inputs with the counter incrementing when one limit signal is received and decrementing when the other limit signal is received; and means for independently changing the pair of limits for each of the independent variables up and down to the next adjacent pair in response to incrementing and decrementing of the counter for the independent variable.

References Cited

UNITED STATES PATENTS

| | | | |
|---|---|---|---|
| 3,164,807 | 1/1965 | Reque | 235—197 X |
| 3,261,971 | 7/1966 | Nathan | 235—197 |
| 3,264,457 | 8/1966 | Seegmiller et al. | 235—197 X |

MALCOLM A. MORRISON, *Primary Examiner.*

J. F. RUGGIERO, *Assistant Examiner.*